United States Patent [19]
Uchida et al.

[11] Patent Number: 5,740,194
[45] Date of Patent: Apr. 14, 1998

[54] SOLID-STATE LASER APPARATUS

[75] Inventors: Takahiro Uchida; Shinichi Nakayama, both of Noda, Japan

[73] Assignee: Miyachi Technos Corporation, Chiba, Japan

[21] Appl. No.: 616,324

[22] Filed: Mar. 15, 1996

[30] Foreign Application Priority Data

Mar. 17, 1995 [JP] Japan .................................. 7-059003

[51] Int. Cl.$^6$ ..................................................... H01S 3/091
[52] U.S. Cl. .................. 372/75; 372/25; 372/69; 372/70; 372/71
[58] Field of Search ........................... 372/25, 26, 29, 372/31, 32, 38, 40, 69, 70, 75, 71

[56] References Cited

U.S. PATENT DOCUMENTS

| | | | |
|---|---|---|---|
| 4,439,861 | 3/1984 | Bradford | 372/25 |
| 4,710,940 | 12/1987 | Sipes, Jr. | 372/75 |
| 4,942,586 | 7/1990 | Lai | 372/68 |
| 5,121,404 | 6/1992 | Aoshima et al. | 372/75 |
| 5,400,351 | 3/1995 | Montgomery et al. | 372/34 |
| 5,463,649 | 10/1995 | Ashby et al. | 372/40 |

*Primary Examiner*—Brian Healy

[57] ABSTRACT

A laser system is provided with a plurality of light emitting diodes arranged to energize the laser source. The individual diodes have separate controls so that they may be turned on separately from one another for different periods of time and to produce different amounts of illumination. A controller such as a CPU may be programmed to actuate the controllers in a desired manner to achieve to a controlled light profile upgrading versatility and accuracy of laser systems. In addition to sequencing individual light emitting diodes in various combinations, the diodes may be energized simultaneously in various combinations. A first combination may be illuminated for a relatively long time and a second combination energized to overlap part or all of the period of that first combination, or even to extend beyond the period of the first. Thus, in addition to adjusting pulse width time, time spacing between pulses and overlap of pulses may be adjusted as well as light amplitude of individual diode light sources.

4 Claims, 3 Drawing Sheets

SOLID-STATE LASER APPARATUS

FIELD OF THE INVENTION

This invention relates to a solid-state laser apparatus for emitting laser beam onto workpieces thereby to carry out drilling, cutting, welding, soldering and the like processing thereon, more particularly that which can carry out a high-speed pulse control.

BACKGROUND OF THE INVENTION

In general, among other machine tools, a solid-state laser apparatus is well known for focusing laser beam through lens to emit laser beam onto workpieces thereby to carry out processings such as drilling, cutting, welding and soldering, and such solid-state laser apparatus uses discharge tubes such as flashlamp and arc lamp as its excitation source.

More recently, a novel solid-state laser apparatus is developed, which has so-called waveform control function in which the laser beam output is pulse-controlled, for the purpose of carrying out a higher accuracy of processing such as precision welding. This waveform control function can be realized through adding control circuits of bank system or inverter system.

However, control circuit of bank system requires a plurality of capacitor banks, and control circuit of inverter system needs transformer and the like, thus leading to a large scale of power supply circuit and high cost of apparatus itself in any of said two systems. Further, since the excitation source used is a discharge tube such as flashlamp, characteristics of said discharge tube do not allow its light emission to be controlled in precise time width below tens of micro second. Accordingly, the desire to realize various waveform controls through high-speed pulse control could not be satisfied so far.

SUMMARY OF THE INVENTION

For eliminating the above-described disadvantages, the present invention has as its object a solid-state laser apparatus which can carry out processing on workpieces at the optimum processing conditions by means of precise, i.e., high-speed pulse control thereby to realize a waveform control showing a higher accuracy and more working variety than heretofore known technics.

For achieving the above-mentioned object, the present invention delivers a novel solid-state laser apparatus for generating laser beam by emitting light from excitation source onto solid-state laser active medium thereby to excite atoms in active substance within the solid-state laser active medium, in which the excitation source is formed by a plurality of laser diodes, outputs of the laser diodes being each controlled by output controller.

The output controller is preferably formed so as to control output of each laser diode through controlling amplitude and time width of output pulse from each laser diode.

Further, the output controller is preferably formed so as to drive successively laser diodes one by one or simultaneously a plurality of laser diodes.

In solid-state laser apparatus formed as above, a plurality of laser diodes are used as excitation source for exciting atoms in solid-state laser active medium, so that amplitude and time width of output pulse of each laser diode can be variably controlled by the output controller, thereby to drive and control output of each laser diode in pulse mode, thus leading to a high-speed pulse control of laser beam used for processing.

Thus according to the invention, a more high-speed pulse control becomes possible which allows much higher accuracy and abundant variety of waveform control, so that various processing conditions onto workpieces can be satisfied, thus processing being carried out with optimum conditions.

DETAILED DESCRIPTION OF THE EMBODIMENTS

Embodiments of the present invention are now described more in detail with reference to FIG.1 through FIG.6.

Figure 1:
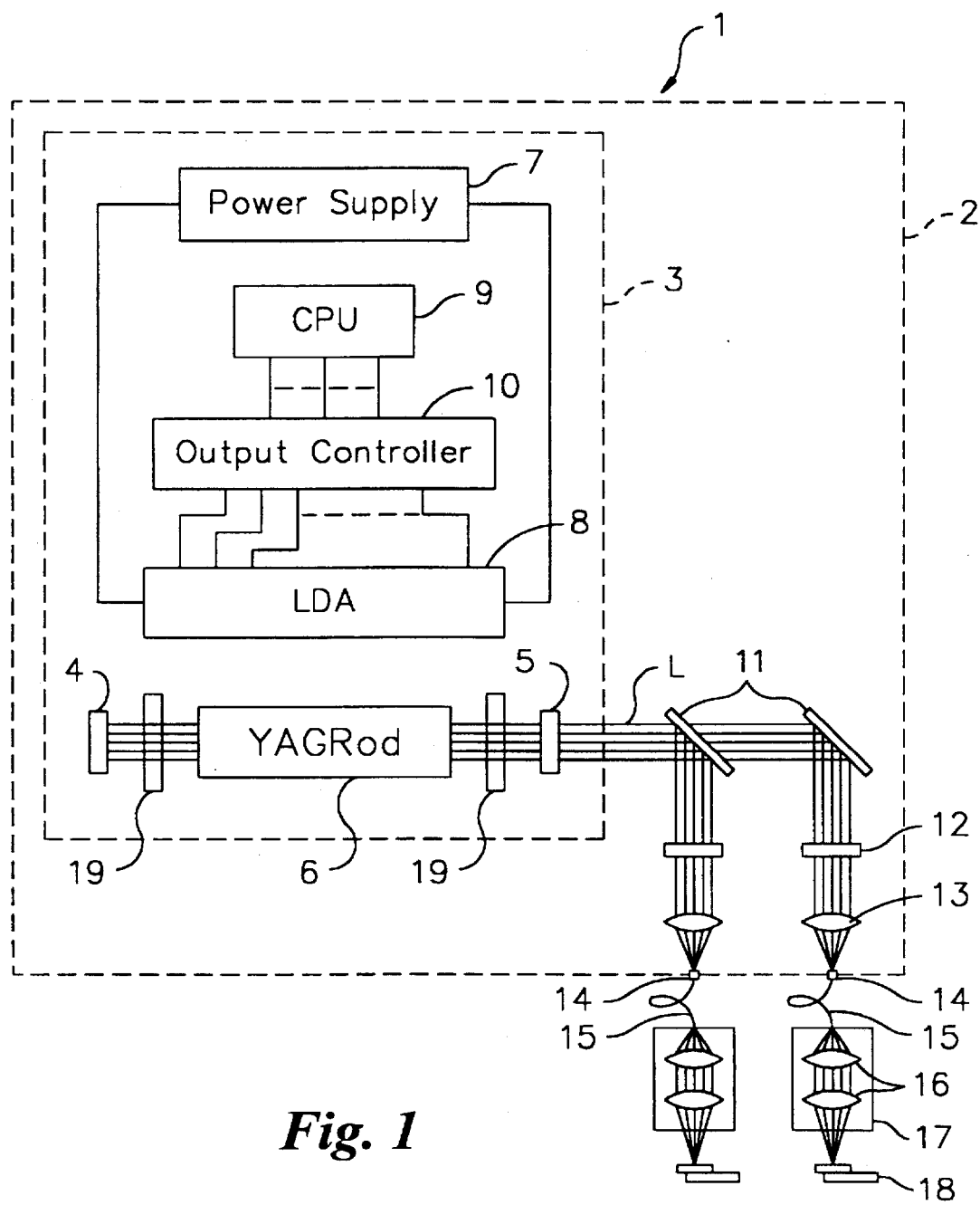
FIG.1 is a schematic view showing the overall structure of an embodiment of solid-state laser apparatus according to the invention.

In FIG.1, YAG laser apparatus 1 comprises a YAG laser oscillator 3 fixed on a desired oscillator base 2. The YAG laser oscillator 3 comprises a YAG rod 6 as solid-state laser active medium located between total reflection mirror 4 and output mirror 5, thereby to excite atoms in the YAG rod 6 by means of light from an excitation source 8 driven by a power supply 7 toe it laser beam L through the output mirror 5.

In this embodiment, the excitation source 8 is not a discharge tube as used so far, but an alignment of a plurality of lasers diodes. This excitation source 8 is controllably driven by CPU 9 and output controller 10 as described later more in detail, thereby to precisely control at high speed the laser beam output from the YAG rod 6.

Laser beam L emitted through output mirror 5 is partially or totally reflected by suitable beam splitters 11, 11 located at the right side of the output mirror 5 to be diverted to optical fiber injection lenses 13. A branching shutters 12 for cutting off split laser beams are provided between the beam splitters 11, 11 and the optical fiber injection lenses 13. Laser beams through optical fiber injection lenses 13 are concentrated onto a laser output terminal 14, 14 formed from light connectors and the like thereby to get a plurality of branched outputs. Laser beams L concentrated onto the laser output terminals 14,14 are transmitted through optical fibers 15 into suitable focusing head 17, 17 located at suitable positions and having each two lenses 16, and are emitted on suitable workpieces 18, 18. Main shutters 19 for safety use are located respectively between YAG rod 6 and the total reflection mirror 4 and between YAG rod 6 and the output mirror 5.

The mechanism for generating laser beam constituting the essential portion of the embodiment of the present invention is now described with reference to FIG.2.

Figure 2:
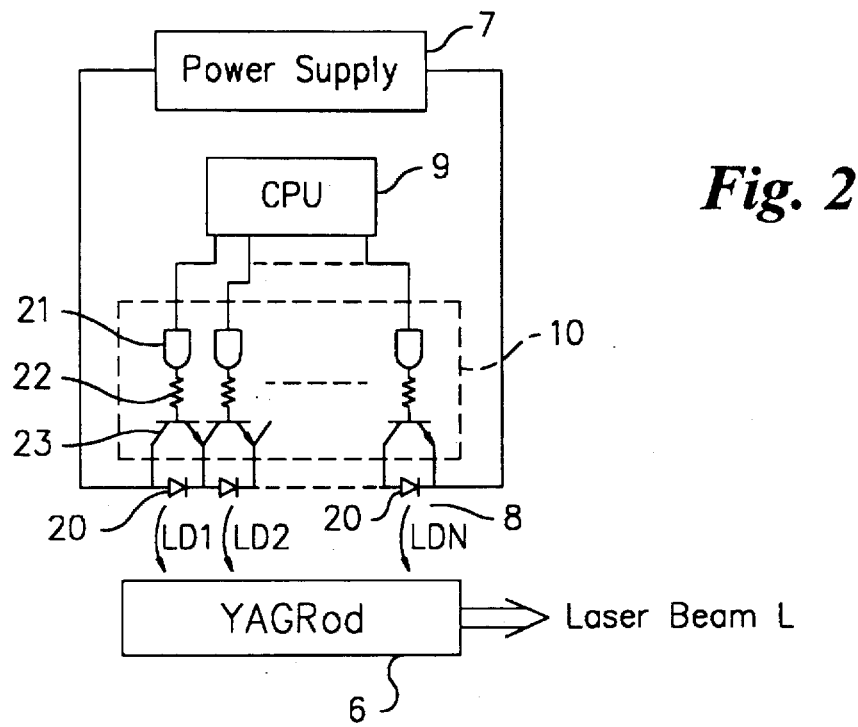
FIG.2 is a circuit diagram for explaining the function of essential portion of solid-state laser apparatus according to the invention.

The embodiment shown in FIG.2 has lateral excitation system, in which excitation source 8 for exciting atoms in YAG rod 6 as solid-state laser active medium for generating laser beam L comprises a plurality of (n) laser diodes 20 juxtaposed along the lateral side of the YAG rod 6.

Said n laser diodes 20 connected with each other in series are also connected to a power supply 7 for driving respective laser diodes 20. An output controller 10 for driving respective laser diodes 20, 20 and controlling their output conditions is connected thereto, while CPU 9 for outputting desired driving signals for each laser diode 20 is connected to the output controller 10.

Output controller 10 comprises control circuits each having a gate 21 for receiving signals from the CPU 9, a resistor 22 connected to the gate 21, and a transistor 23 each having base connected to the resistor 22, and these control circuits correspond respectively to the laser diodes 20, 20.

Figure 3:
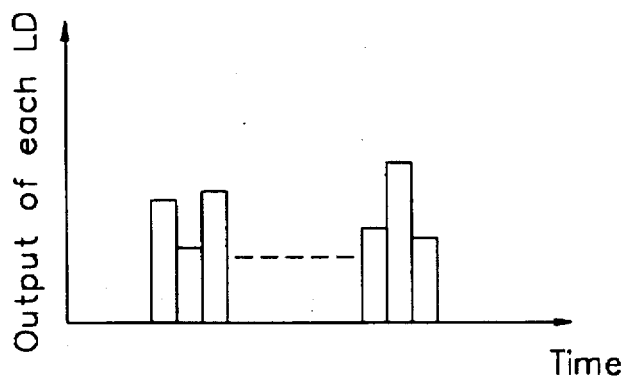
FIG.3 is a graph showing the outputs of respective laser diodes used in the laser apparatus.

Operation of the embodiment of this structure described above is as follows:

When the operational conditions of the YAG laser apparatus 1 are set and driving thereof is started, CPU 9 generates signals to the output controller 10 for driving respective laser diodes 20. These driving signals determine time width and light intensity of each laser diode 20. Respective laser diodes 20 comprising LD1 to LDn are successively driven in pulse mode to output excitation light as shown in FIG.3.

Figure 4:
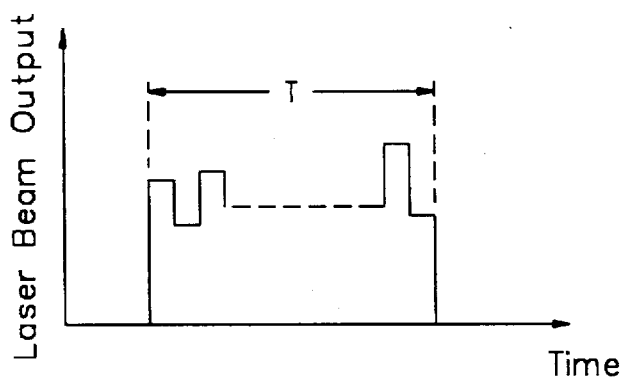
FIG.4 is a graph showing the waveform of laser beam output from solid-state rod based on output conditions of semiconductor laser array.

When laser diodes 20 successively emit light in such a manner, YAG rod 6 using this emission as excitation source generates a laser beam L corresponding to time width and light intensity of the respective emitted light. When output conditions of respective laser diodes 20 from LD1 through LDn are as described in FIG.3, the resultant output of YAG rod 6 will have a pulse width T and a waveform as shown in FIG.4. Thus, laser beams controlled in a waveform as shown in FIG.4 will be emitted onto workpiece 18.

As described above, according to this embodiment, driving conditions of respective laser diodes 20 constituting excitation source 8 of YAG rod 6 can be varied for varying time width and light intensity thereof, thereby to vary output waveform of laser being from YAG rod 6 as desired. Consequently, waveform control can be carried out so as to correspond to the optimum conditions necessary to processing of workpiece 18.

Since the characteristics of laser diode allows instantaneous pulse driving, its emission time width can be controlled precisely in unit of several hundreds of nanoseconds, so that the wave form of laser beams emitted from YAG rod 6 can be controlled considerably more precisely than the heretofore known cases using discharge tubes as excitation source, without the need of complicated control circuits. As a result, an abundant variety of processing can be carried out on workpiece 18.

While in the above embodiment, a plurality of laser diodes are arranged in line as excitation source of YAG rod 6, excitation source can also comprise laser diode arrays as respective laser diodes.

Figure 5:
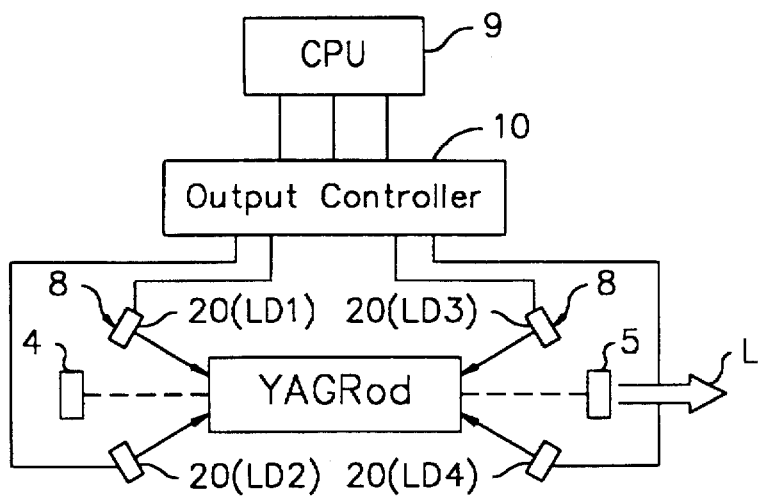
FIG.5 is another embodiment of essential portion of solid-state laser apparatus according to the invention.

With reference to FIG.5 showing another embodiment wherein an end-face excitation system is used for laser begun generating mechanism, excitation source 8 for exciting atoms in YAG rod 6 constituted from solid-state laser crystal comprises one or a plurality of laser diodes 20 or arrays thereof on each end-face (in this embodiment, two laser diodes on each end face, i.e., four laser diodes on both end faces, such as LD1, LD2, LD3 and LD4), each of these laser diodes emitting light in a direction making an angle to laser beam axis of YAG rod 6.

Respective laser diodes LD1, LD2, LD3 and LD4 are connected to an power supply (not shown) and also to an output controller 10 for driving respective laser diodes and controlling the outputs thereof. Said output controller 10 is connected to CPU 9 to generate driving signals to respective laser diodes LD1, LD2, LD3 and LD4.

Other structure of this embodiment is the same as that of the preceding embodiment.

The operation of this embodiment having the structure as described above is now described hereinbelow.

When the operational conditions of the YAG laser apparatus 1 are set and driving thereof is started, CPU 9 generates signals to the output controller 10 for driving respective laser diodes 20. These driving signals determine time width and light intensity of each laser diode 20. Respective laser diodes 20 comprising LD1 to LD4 are successively driven in pulse mode to emit light.

When laser diodes 20 successively emit light in such a manner, YAG rod 6 using this emission of light as excitation source generates a laser beam L corresponding to respective time width and light intensity of the emitted light.

Since this embodiment is of end-face excitation system, patterns of excitation laser output as shown in FIG.6(a) to FIG.6(f) can be obtained by regulating light emission time period and light intensity of respective laser diodes, i.e., laser diodes LD1, LD2, LD3 and LD4.

Excited laser outputs of respective laser diodes LD1, LD2, LD3 and LD4 are designated herein by LP1, LP2, LP3 and LP4. In the case where a plurality of laser diodes are arranged at respective end faces of YAG rod 6 in the end-face excitation system, it is preferable to make equal respective outputs of all the laser diodes for making uniform the spatial distribution of excitation light. For example, all the laser diodes can be preferably balanced in such a manner as LP1=LP2 and LP3=LP4.

FIG. 6 shows that combinations of laser diodes driven simultaneously may vary and be changed with respect to time and pulse amplitude, separation of combination pulses and width of and relative positions of superimposed pulses of diode combinations.

Figure 6A:
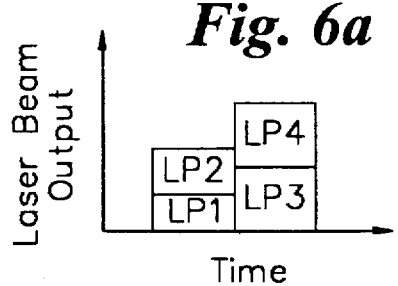
FIG.6(a) to (f) are graphs showing the waveform of laser beam output from solid-state rod based on output conditions of laser diode array shown in FIG.5.
Figure 6B:
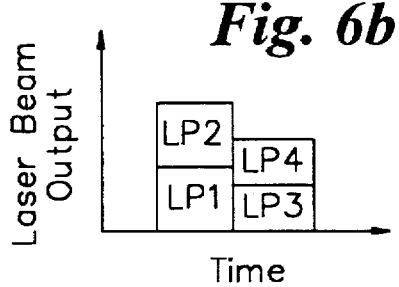
Figure 6C:
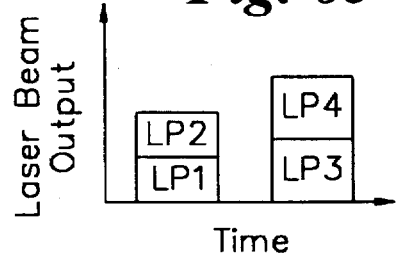
Figure 6D:
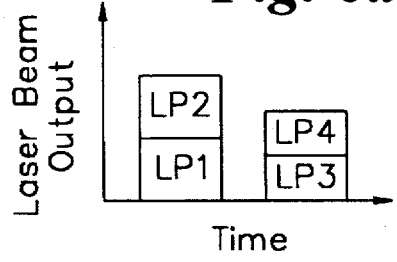
Figure 6E:
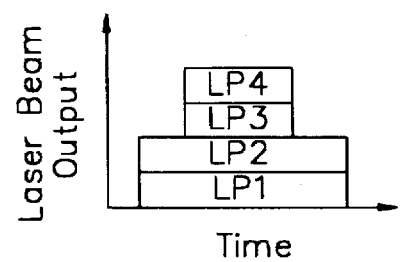
Figure 6F:
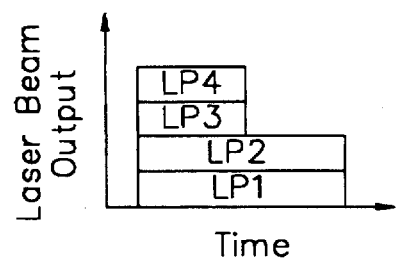

Graphs shown in FIG. 6(a) and (b) are obtained by first driving simultaneously two laser diodes LD1 and LD2 immediately followed by driving simultaneously other two laser diodes LD3 and LD4, wherein (a) is obtained by LP1=LP2<LP3=LP4, and (b) is obtained by LP1=LP2>LP3 =LP4. Graphs shown in FIG. 6 (c) and (d) are obtained by first driving simultaneously two laser diodes LD1 and LD2 and then by driving other two laser diodes LD3 and LD4 after a predetermined time period, wherein (c) is obtained by LP1=LP2<LP3=LP4, and (d) is obtained by LP1=LP2>LP3 =LP4. Graphs shown in FIG.6 (e) and (f) are obtained by driving simultaneously two laser diodes LD1 and LD2 in a time period and then driving other two laser diodes LD3 and LD4 in such a manner to overlap said time period.

As is clear from the above description, various excitation laser output patterns are selected corresponding to driving conditions of YAG laser apparatus 1 according to the invention.

Since excitation laser output from laser diode is not damped but maintained at the same level in the driving time period of said diodes, output control can be carried out with a higher accuracy than by heretofore known capacitor banks and/or excitation lamps having damping output. It is also possible to replace laser diodes by any light emitting elements having emission spectrum of excitation wavelength.

Further, solid-state laser apparatus according to the invention can be used not only in industrial machines, but also in medical machines, dentistry machines and other industrial fields.

While the present invention has been described with reference to exemplary embodiments thereof, it will be appreciated by those skilled in the art that variations and modifications may be made thereto without departing from the spirit of the inventive concepts disclosed herein. All such variations and modifications are intended to fall within the scope of the claims appended thereto.

What is claimed is:

1. Solid-state laser apparatus for generating laser beam by emitting light from excitation source onto solid-state laser active medium thereby to excite atoms in active substance within said solid-state laser active medium, which is characterized in that said excitation source is formed by a plurality of laser diodes, and an output controller is provided so as to control outputs of said laser diodes by driving successively laser diodes one by one or by driving successive simultaneous combinations of a plurality of laser diodes in sequence.

2. Solid-state laser apparatus for generating laser beam by emitting light from excitation source onto solid-state laser active medium thereby to excite atoms in active substance within said solid-state laser active medium, which is characterized in that said excitation source is formed by a plurality of laser diodes, and an output controller is provided so as to control outputs of said laser diodes by driving successively laser diodes one by one, or causing different combinations of a plurality of laser diodes to be driven simultaneously to change with respect to time.

3. Solid-state laser apparatus according to claim 1 or claim 2, which is characterized in that said output controller controls output of each laser diode through controlling amplitude and time width of output pulse from said each laser diode.

4. Solid-state laser apparatus according to claim 1 or claim 2, which is characterized in that said output controller controls output of each laser diode through controlling pulse separation time between successive output pulses from said each laser diode.

* * * * *